United States Patent

Amodei

[15] 3,651,488

[45] Mar. 21, 1972

[54] INFORMATION STORAGE SYSTEM EMPLOYING OPTICAL ENTRY AND REMOVAL OF INFORMATION

[72] Inventor: Juan Jose Amodei, Langhorne, Pa.

[73] Assignee: RCA Corporation

[22] Filed: June 8, 1970

[21] Appl. No.: 44,195

[52] U.S. Cl. ....................................340/173 CC, 340/173.2

[51] Int. Cl. ....................................G11c 11/22, G11c 11/42

[58] Field of Search ....................340/173 CC, 173 LT, 173.2

[56] References Cited

UNITED STATES PATENTS 3,383,664 5/1968 Chen et al. ......................340/173 CC 3,107,170 10/1963 Netke ..............................340/173 CC

OTHER PUBLICATIONS

Applied Optics, " Thick Holograms in Photochromic Materials" by Bosomworth et al., Vol. 7, No. 1, 1/68 pgs. 95- 98, 340-173 CC.

*Primary Examiner*—Stanley M. Urynowicz, Jr.
*Attorney*—Glenn H. Bruestle

[57] ABSTRACT

An information storage system including a storage medium comprising a first material characterized by a change in its index of refraction under the influence of an electric field and a different second material characterized by the inducibility of an electric field therein by optical means. The storage medium can be an admixture of two different materials that respectively exhibit these characteristics. Alternatively, the storage medium comprises a plurality of interleaved layers, alternate ones of these layers comprising material exhibiting one of these characteristics and the other layers comprising material exhibiting the second type of characteristic.

10 Claims, 5 Drawing Figures

INVENTOR.
Juan J. Amodei
BY Leon Nigohosian
ATTORNEY

INFORMATION STORAGE SYSTEM EMPLOYING OPTICAL ENTRY AND REMOVAL OF INFORMATION

BACKGROUND OF THE INVENTION

The present invention relates to an information storage system and particularly to such a system including a storage medium in which information is optically entered and removed.

The prior art comprises an information storage system that includes a crystal of ferroelectric material that exhibits electrically controlled, optically induced changes in the index of refraction of the crystal, which crystal serves as a holographic storage medium. In the operation of such a system a DC electric field is produced by applying a DC potential to the crystal of the ferroelectric material or by "poling" the crystal in a manner known in the art (to align the electric domains), and a suitable light beam is caused to impinge upon the ferroelectric crystal. The combined influence of the optical excitation by the light beam and the electric field results in localized areas that include unneutralized charges that create corresponding changes in the refractive index of the ferroelectric crystal, at those areas that are impinged by the light beam. The application of the DC potential to the ferroelectric crystal is achieved by providing an electrode on one or more respective surfaces of the ferroelectric crystal. In order to provide such an electrode a layer of electrically conducting material is produced on a surface of the crystal by evaporation, sputtering, or other methods, and electrical connections are made to these electrodes. Such electrodes for producing the electric field are not completely satisfactory because of the added expense of processing of the crystal (e.g., evaporation, etc.), and/or because of the possible adverse optical effects that these electrodes will have on light that is passed through the crystal. Also, the provision of an electric field by the application of a DC potential is not completely satisfactory because of the requirements of additional equipment (e.g., high voltage power supplies) for use with the system.

Where the electric fields are internally generated by the polarization charges of the material, the choice of materials for the storage crystal is limited since there are required ferroelectric crystals that have inhomogenities in their internal polarization fields. These inhomogenities are necessary for the presence of the field; however, they may generate undesirable optical effects. Also, the production of an electric field by poling the crystal is not desirable because of the cost and time required for processing.

SUMMARY OF THE INVENTION

The present invention is a novel information storage system comprising: a storage medium comprising a first material characterized by a change in the index of refraction thereof under the influence of an electric field (internal and/or external to the storage medium) and a different second material characterized by the inducibility of such an electric field therein (by optical methods), and means for inducing such an electric field in the storage medium. In one embodiment of this invention, the information storage medium comprises an electro-optic composition, which exhibits a change in the index of refraction under the influence of an electric field, and a photochromic composition in which an electric field sufficient to cause such a change in the index of refraction can be optically induced.

In a further embodiment, the storage medium comprises a single structural element that comprises an admixture of a first material characterized by the change in its index of refraction under the electric field influence and a different second material in which an electric field can be optically induced.

In another embodiment, the storage medium comprises a multilayer structure comprising at least one layer that comprises a first material characterized by a change in the index of refraction and at least one other layer that comprises a different second material in which an electric field can be optically induced, these at least two layers being spatially related so that the electric field in the second one thereof influences the first one thereof.

Among its advantages the present invention permits the optical storage of information in a storage medium exhibiting change in the index of refraction under the influence of an electric field without the need for providing electrodes on the storage medium and, unlike those prior art systems relying on the generation of internal electric fields by the polarization charges of the material, the present invention is not necessarily limited to storage media that are of ferroelectric material.

DESCRIPTION OF PREFERRED EMBODIMENTS

Figure 1:
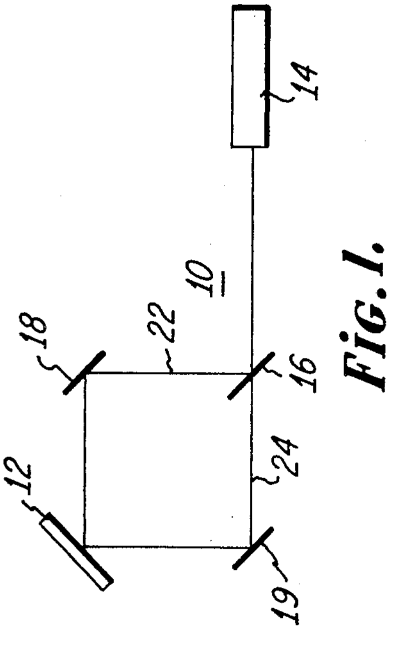
FIG. 1 is a schematic illustration of an information storage system of the type described herein, which system includes a storage medium in which information can be stored by optical means alone.

FIG. 1 illustrates an information storage system 10 that includes a storage medium 12 and a holographic imaging subsystem that includes: a laser beam source 14, a beam splitter 16, and beam deflection mirrors 18 and 19. The storage medium 12 comprises a single sheet 20 (FIG. 2) comprising a first material in which there can be produced, by optical means alone, a number of regions of unneutralized charges and a different second material which exhibits a change in the index of refraction (as, for example, phase retardation or birefringence, both of which are known in the art) thereof in response to the influence of the electric field produced by these charges. As used herein, the term "optical" is defined to include electromagnetic waves.

The material in which the regions of unneutralized charges can be produced is, for example, one that contains localized impurity states having electrons that are optically excitable into a free state. The impurity state may be of the form of, for example,: a vacancy in the lattice of the material; a dislocation or other lattice defect; or an atom of additive material, or dopant, that has such optically excitable electrons. Examples of such a material include a photochromic material, such as calcium fluoride doped with rare earth ions, as well as materials that are not photochromic but that do contain impurity centers (e.g., a single element-doped strontium titanate, the single element dopant being, inter alia, molybdenum or iron).

The material capable of exhibiting changes in the index of refraction thereof in response to the electric field produced by the unneutralized charges preferably exhibits electro-optic properties so that an electric field applied thereto creates local variation in light transmission. Such variation in light transmission can be due to a phase difference or a relative retardation arising between the electric vector components along two perpendicular directions of plane polarized light (i.e., the object beamlet, discussed below) passed therethrough. This latter phenomenon is known as Pockels effect. Such materials that exhibit changes in index of refraction are, for the single sheet storage medium 20, mixed with the material in which the unneutralized charges are producible, and include lithium niobate, strontium-barium niobate, and strontium titanate.

Figure 3:
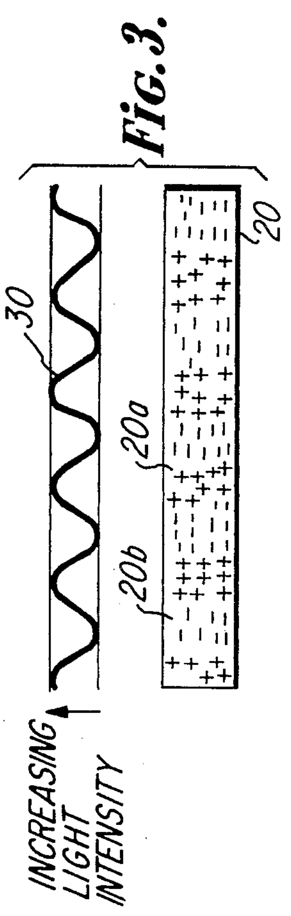
FIG. 3 is a schematic illustration of the storage medium shown in FIG. 2, in which storage medium there are produced zones of neutralized charges that produce an internal electric field therein, there being superimposed on the target a graphic representation of the intensity of the holographic light that is caused to impinge upon the storage medium to optically induce the electric field.

In the operation of the storage system 10, the laser beam, having a wavelength of about 4880 A, for example, is produced by the laser source 14 and passed through the beam splitter 16 to produce the laser beamlets 22 and 24 that are, respectively, the object and reference beamlets. The beamlets 22 and 24 are reflected from the respective deflection mirrors 18 and 19 and projected onto the storage medium 12 to produce a holographic image therein. The holographic image embodies the information that is sought to be stored. The exposure of the sheet 20 comprising the storage medium 12 to the light intensity pattern comprising the hologram results in an electric field pattern (FIG. 3) of unneutralized charges having a distribution corresponding to the light intensity pattern 30 of the hologram. The production of the electric field pattern is thought to be attributable to the diffusion of the optically excitable electrons away from the regions of the sheet 20 where they are generated (i.e., the regions, such as **20*a* of the sheet 20 where the light intensity is greater) and toward the regions (e.g., 20*b*) of lower light intensity. The resulting pattern of alternating zones of unneutralized charges creates an electric field that induces a corresponding change in the index of refraction of the electro-optic material comprising the sheet 20. The change in the index of refraction causes a phase modulation of the light transmitted through the sheet 20 in accordance with these changes in the index of refraction. The exposure of the sheet 20** to the holographic image light is done for sufficient time to allow the electron diffusion to take place (preferably, at least several minutes) and at temperatures (e.g., room temperature) where the thermal energy of the electrons is sufficient to create a substantial electric field in the storage medium.

Where the light pattern striking the sheet 20 has a substantially sinusoidal light intensity distribution, as shown in FIG. 3, the peak field strength Emax that can be obtained in approximated by the expression:

$$E_{max} \approx 2\pi kT/e\lambda$$

where $\lambda$ is the wavelength of the interference pattern;

*k* is the Boltzmann constant;

T is the temperature (absolute); and

*e* is the electron charge. At room temperature and with a 10,000 A grating light pattern (i.e., $\lambda$) produced on the sheet 20, there can be produced, according to the above expression, an Emax of about 1600 volts/cm., which is sufficient to produce localized changes in the index of refraction of the sheet 20 (where the electro-optic material is barium strontium niobate, for example) according to the distribution of electrical charges therein.

To read out the information stored in the storage medium 12, only the reference beamlet 22 is allowed to impinge on the storage medium. The reference beamlet 22 is transmitted through the storage medium 12 according to the electric field-induced changes in the index of refraction therein, the transmitted light embodying the information stored in the storage medium, which light can then be projected on a viewing surface or otherwise used. It is not necessary that the same wavelength light be used for writing and reading, so that there can be selected for reading a light having a wavelength that has minimal effect on the information stored in the storage medium. This results in significantly longer information readout times, particularly when a non-photochromic material comprises the storage medium.

Alternatively, the storage medium 12 (FIG. 1) can comprise a first sheet 31 (FIG. 4) comprising a material in which there can be produced, by optical means, a number of regions of unneutralized charges, and a second sheet 32 comprising a material which exhibits a change in the index of refraction thereof in response to the influence of an electric field produced by these charges. As mentioned above, the material comprising the first sheet 31 is, for example, one that contains localized impurity states having electrons that are optically excitable into a free state while the material comprising the second sheet 32 preferably exhibits electro-optic properties so that an electric field applied thereto creates local variation in light transmission as described with respect to FIG. 2.

Figure 4:
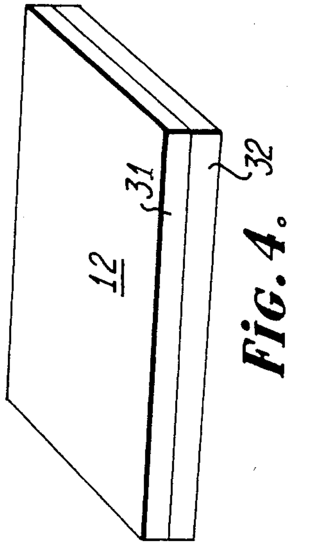
FIG. 4 is a perspective view of a storage medium made according to another embodiment of the present invention and comprising a first layer of a first material exhibiting a change in the index of refraction thereof in response to an electric field and a second layer comprising a second material in which such an electric field can be optically induced.

While the storage medium is shown in FIG. 4 to include contiguous sheets 31 and 32, the sheets can also be physically separated. In all cases, the layers of the storage medium should be spatially related such that the electric field produced in one layer (as discussed below) is able to influence the other layer of material having a changeable index of refraction.

Figure 2:
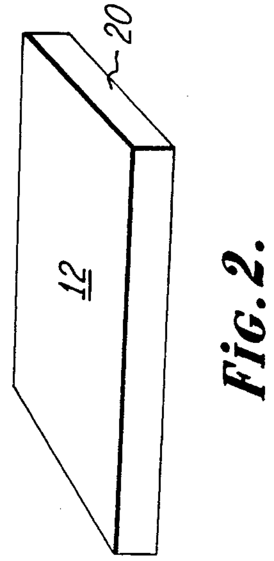
FIG. 2 is a perspective view of a storage medium, according to one embodiment, consisting of a single structure comprising a first material exhibiting a change in the index of refraction under the influence of an electric field and a second material in which such an electric field can be optically induced.

The operation of the storage system 10 employing a plural layer storage medium (e.g., that shown in FIg. 4) is comparable to that described with respect to FIG. 2. Specifically, the exposure of the sheet 31 of the storage medium 12 to the light intensity pattern comprising a hologram results in an electric field pattern (similar to that in FIG. 3) of unneutralized charges having a distribution corresponding to the light intensity pattern of the hologram. The resulting field pattern of alternating zones of unneutralized charges creates an electric field that induces a corresponding change in the index of refraction of the material comprising the second sheet 32. The change in the index of refraction causes a phase modulation of the light traversing the second sheet 32 in accordance with these changes in the index of refraction. The exposure of the first sheet 31 to the holographic image light is done for sufficient time to allow the electron diffusion to take place (preferably, at least several minutes) and at temperatures (e.g., room temperature) where the thermal energy of the electron is sufficient to create a substantial electric field.

To read out information stored in the storage medium of FIG. 4 is done in the manner described with respect to FIG. 2, the reference beamlet 22 being transmitted through the storage medium according to the electric field-induced changes in the index of refraction of the second sheet 32 and the transmitted light embodying the information stored in the storage medium.

As another alternative embodiment, the storage medium 12 (FIG. 1) may comprise a structure (FIG. 5) comprising several alternating layers of, respectively, a first material (the layers indicated as 40) in which a pattern of unneutralized charges can be produced optically and a second material (the layers indicated as 42) that exhibits a change in the refractive index in response to the electric field produced by these charges.

Figure 5:
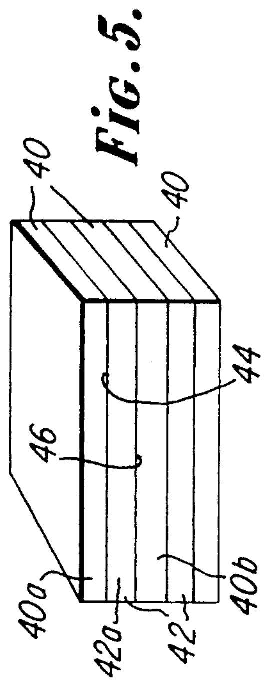
FIG. 5 is a perspective view of a storage medium made according to still another embodiment of the invention.

These layers 40 and 42 may be contiguous, as shown in FIG. 5, or they may be physically separate from each other if the layers 42 are within the influence of the electric fields provided by the layers 40. An advantage of a structure of the type shown in FIG. 5 (where each layer 42 is included between two layers 40) is that the respective electric fields produced by the optically responsive layers (e.g., 40 and **40*b*) containing the unneutralized charges need to extend into the other layers (e.g., 42*a*) of material exhibiting a change in refractive index, by considerably less than the thickness of these other layers (42) since each one of these electric fields acts on these other layers (42) at one of the two surfaces (44 and 46**) thereof. The present invention may be practiced with thin (planar) holograms and with thick (or three-dimensional holograms, both of which are well known in the art.

I claim:

1. An information storage system comprising:

a. a storage medium including 1. a first material characterized by a change in the index of refraction thereof under the influence of an electric field and
  2. a different second material adjacent to said first material, characterized by the optical inducibility of said electric field therein; and b. means for optically inducing said electric field in said second material.

2. The information storage system defined in claim 1, wherein said second material contains localized impurity states having electrons that are optically excitable into a free state.

3. The information storage system defined in claim 1, wherein said second material is selected from the group consisting of calcium fluoride doped with rare earth ions, strontium titanate doped with either iron or molybdenum.

4. The information storage system defined in claim 1, wherein said first material is selected from the group consisting of lithium niobate, strontium barium niobate, and strontium titanate.

5. The information storage system defined in claim 1, wherein said storage medium comprises a single sheet that comprises an admixture of said first and second materials.

6. The information storage system defined in claim 1, wherein said second material comprises a photochromic composition.

7. The information storage system defined in claim 1, wherein said means comprises a holographic imaging subsystem.

8. The information storage system defined in claim 7, wherein said holographic imaging subsystem comprises:

a. a laser beam source;

b. a beam splitter in the path of the laser beam for producing two beamlets; and c. a pair of beam deflection mirrors arranged to reflect said beamlets onto said storage medium.

9. The information storage system defined in claim 1, wherein said storage medium comprises at least one first layer comprising said first material and at least one second layer comprising said second material, said first and second layers being physically related such that said electric field produced in said second layer influences said first layer.

10. The information storage system defined in claim 9, wherein said storage medium comprises a number of said first layers and a second number of said second layers, each one of said first layers being included between two of said second layers.

* * * * *

UNITED STATES PATENT OFFICE
CERTIFICATE OF CORRECTION

Patent No. 3,651,488 Dated 21 March 1972

Inventor(s) Juan J. Amodei

It is certified that error appears in the above-identified patent and that said Letters Patent are hereby corrected as shown below:

In the Abstract, line 6, after "can be" insert

-- a single structure that includes --

Signed and sealed this 22nd day of August 1972.

(SEAL)
Attest:

EDWARD M.FLETCHER,JR.
Attesting Officer

ROBERT GOTTSCHALK
Commissioner of Patents